(12) United States Patent
Grady

(10) Patent No.: US 9,359,154 B2
(45) Date of Patent: Jun. 7, 2016

(54) TRANSFER TRAILER FOR LOADING BALES OF FORAGE INTO A TRANSPORT VEHICLE

(71) Applicant: Michael Jason Grady, Floravista, NM (US)

(72) Inventor: Michael Jason Grady, Floravista, NM (US)

( * ) Notice: Subject to any disclaimer, the term of this patent is extended or adjusted under 35 U.S.C. 154(b) by 110 days.

(21) Appl. No.: 14/064,821

(22) Filed: Oct. 28, 2013

(65) Prior Publication Data

US 2015/0117997 A1 Apr. 30, 2015

(51) Int. Cl.
*B65G 67/20* (2006.01)

(52) U.S. Cl.
CPC .................................... *B65G 67/20* (2013.01)

(58) Field of Classification Search
CPC ........................................................ B65G 67/20
USPC .................................................. 414/345, 400
See application file for complete search history.

(56) References Cited

U.S. PATENT DOCUMENTS

| 3,169,652 | A |   | 2/1965 | Ewell |
|-----------|---|---|--------|-------|
| 3,809,264 | A | * | 5/1974 | Mayers .......................... 414/293 |
| 3,836,020 | A | * | 9/1974 | Lassig ............................ 414/281 |
| 3,857,501 | A | * | 12/1974 | Lassig et al. .................. 414/349 |
| 4,181,460 | A | * | 1/1980 | Lutz .............................. 414/788 |
| 4,487,120 | A |   | 12/1984 | Barstow |
| 4,522,556 | A | * | 6/1985 | Shapiro ......................... 414/809 |
| 4,537,554 | A | * | 8/1985 | Collins, Jr. .................... 414/328 |
| 4,729,304 | A | * | 3/1988 | Gardella et al. .............. 100/218 |
| 6,138,557 | A | * | 10/2000 | Brown et al. ................... 100/41 |
| 6,289,798 | B1 |  | 9/2001 | Van Der Hyde |
| 7,419,348 | B2 |  | 9/2008 | Byrne |
| 7,488,148 | B2 |  | 2/2009 | Byrne |
| 7,699,575 | B2 | * | 4/2010 | Frankel ......................... 414/395 |
| 7,837,428 | B2 |  | 11/2010 | Adams et al. |
| 7,866,932 | B1 |  | 1/2011 | Pool |
| 8,257,007 | B2 |  | 9/2012 | Williams et al. |

* cited by examiner

Primary Examiner — Jonathan Snelting

(57) ABSTRACT

A transfer trailer for loading bales of forage into a transport vehicle includes a press wall mounted on a horizontal deck to be movable between a loading position and a transfer end of the trailer, and the transfer trailer has a sizing structure disposed at the transfer end formed of a hinged door arrangement such that motive means moving the press wall along the deck of the transfer trailer causes the hinged door arrangement to engage a stack of bales loaded onto the deck of the transfer trailer to force the stack of bales into standardized dimensions prior to delivery to a transport vehicle.

2 Claims, 3 Drawing Sheets

TRANSFER TRAILER FOR LOADING BALES OF FORAGE INTO A TRANSPORT VEHICLE

BACKGROUND OF THE INVENTION

1. Field of the Invention

The present invention pertains to transfer trailers for loading bales of forage into a transport vehicle and, more particularly, to such transfer trailers permitting a stack of forage bales to be sized for efficient and safe loading of the bales into a transport vehicle.

2. Brief Discussion of the Related Art

Transport vehicles, in particular box vans, represent a very cost effective way to transport bales of forage over long distances; however, loading of the forage bales with equipment and techniques currently available is difficult and time consuming. Forage, as used herein, means forage crops which are typically annual or biennial and grown to be utilized by grazing or harvesting as a whole crop. Forage is a plant material and, when harvested, is typically placed in bales. The nature of forage is such that the plant material, even after cutting, is irregular in size and the bales are not of uniform size and dimensions and are difficult to handle. The current technique employed to place forage bales in transport vehicles is difficult and tricky to accomplish since forage bales are typically unsymmetrical in any or all axes.

Stacks of forage bales are currently loaded into a transport vehicle manually or using a "squeeze" such that loading of the forage bales as currently accomplished is disadvantageously time consuming and difficult to accomplish.

SUMMARY OF THE INVENTION

A basic aspect of the present invention is to utilize a sizing structure disposed on the deck of a transfer trailer to load forage bales into or onto a transport vehicle.

In another aspect, the present invention uses a hinged door mechanism carried on a transfer end of a deck of a transfer trailer with the hinged door mechanism including opposing doors defining angled walls at the transfer end of the deck such that a horizontal force applied to a stack of bales on the deck will move the stack of bales past the doors which engage the stack of bales to produce a stack of bales with standardized dimensions prior to delivery to a transport vehicle.

A transfer trailer constructed in accordance with the present invention has the advantages of facilitating efficient and safe loading of forage bales into a transport vehicle and can be easily moved into a field or other location where forage bales exist by means of a tractor. A press wall is carried on a deck of the transfer trailer in an orientation to be substantially perpendicular to a deck for contacting a stack of bales which have been loaded onto the deck at a position between the press wall and the transfer end of the deck. Motive means, such as a cylinder or hydraulic ram is connected with the press wall to provide the motive force needed to push a stack of bales along the deck of the trailer, and hinged doors are disposed at the transfer end of the deck to standardize the stack of forage bales to proper dimensions and symmetry for loading into the transport vehicle. A substantially horizontal panel can be used along with side doors to form a chute for maintaining the symmetry and dimensions of the stack as the stack exits the transfer trailer.

Other aspects and advantages of the present invention will become apparent from the following description of the preferred embodiments taken in conjunction with the accompanying drawings wherein like parts in each of the several figures are identified by the same reference characters.

DESCRIPTION OF THE PRESENT INVENTION

Figure 1:
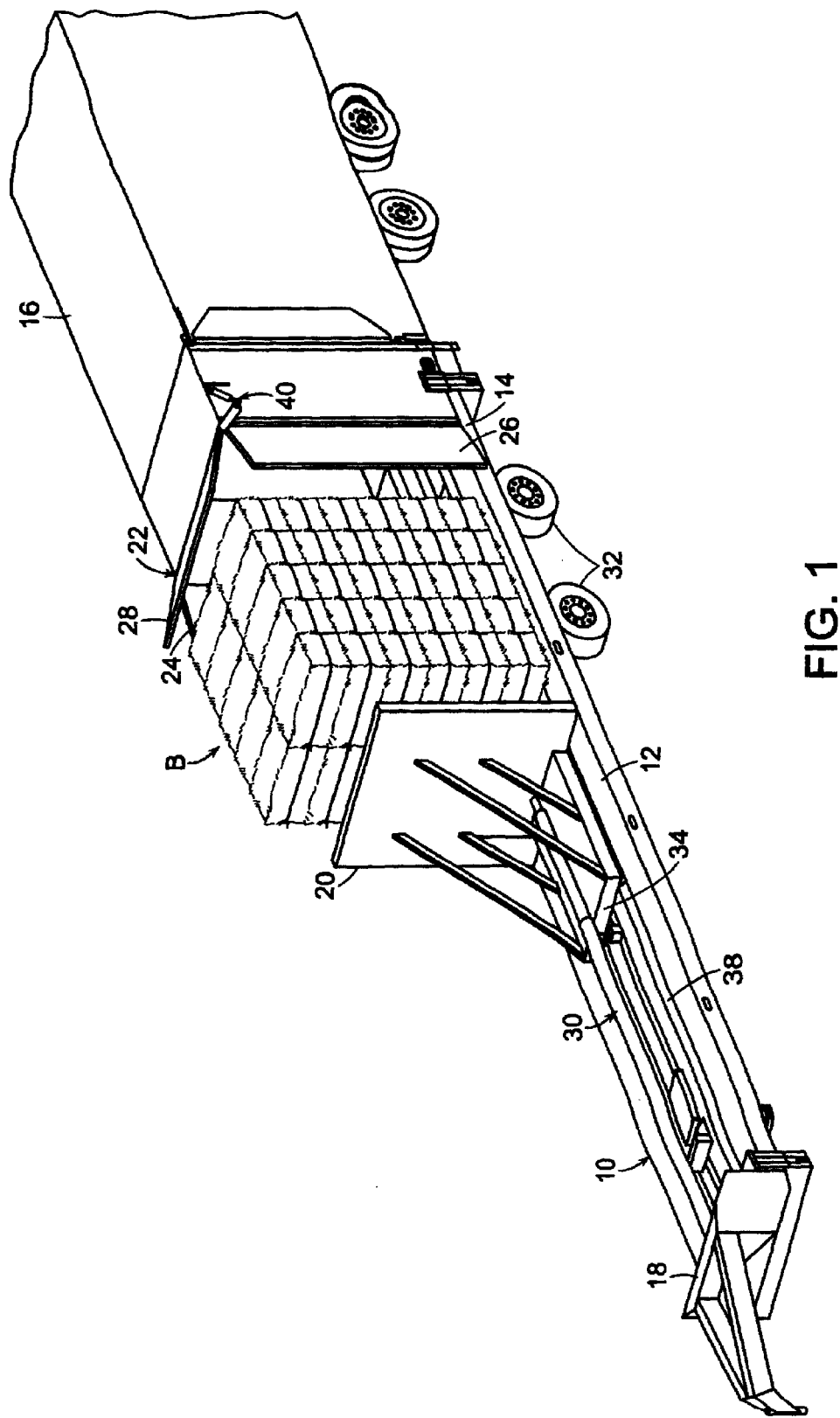
FIG. 1 is a perspective view of a transfer trailer for loading bales of forage into a transport vehicle with a stack of forage bales on a deck of the transfer trailer.

A transfer trailer 10 according to the present invention, as shown in FIGS. 1, 2, 3 and 4, includes a substantially horizontal deck 12 having a transfer end 14 for association with a transport vehicle 16 and a towing end 18 for connection with a tractor or other towing vehicle (not shown) to allow the transfer trailer to be moved to an area where forage bales are located, such as in a field. A press wall 20 is mounted on the deck 12 to be movable between the transfer end 14 and a loading position between the transfer end and the towing end 18. A sizing structure 22 is disposed on deck 12 adjacent transfer end 14 and includes opposing side doors 24 and 26 and a top door 28. The doors 24, 26 and 28 are hingedly coupled to a frame at the transfer end 14 such that, in an open loading position, the opposed side doors are angled away from a center line of the deck and the top door is angled upwardly away from the deck.

Figure 2:
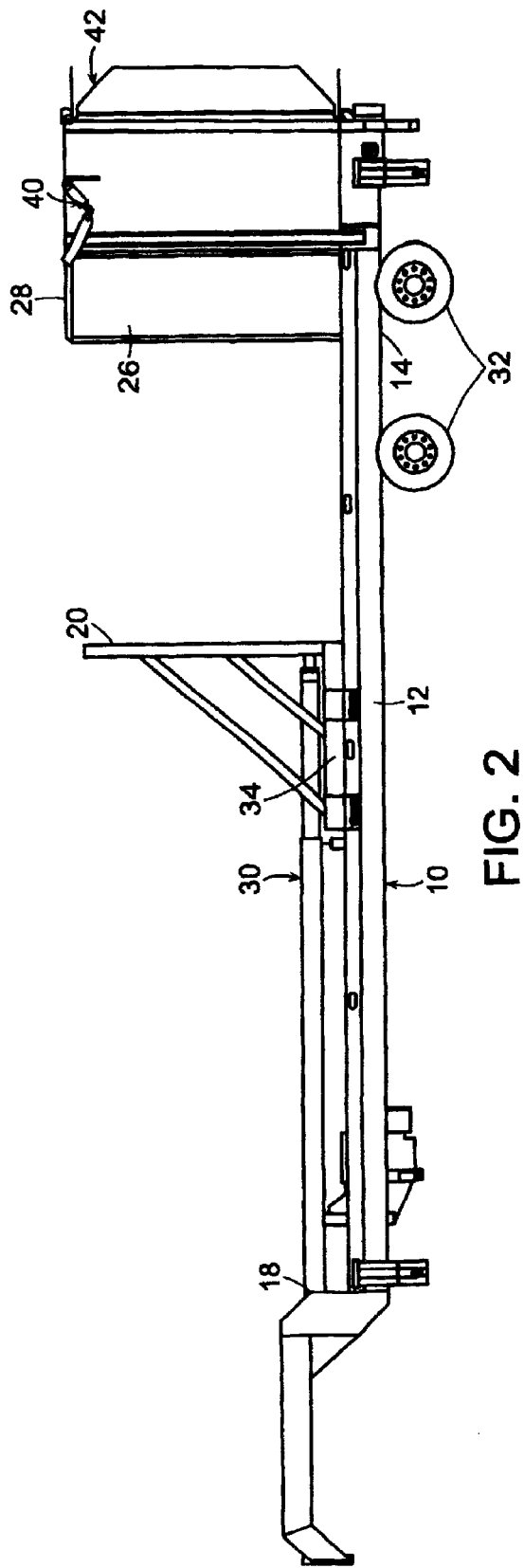
FIG. 2 is a side plan view of the transfer trailer shown in FIG. 1.

Motive means 30, such as an hydraulic cylinder and piston, a pneumatic or other fluid or electrical powered motor, are mounted on the deck at the towing end 18 and are attached to the press wall 20 in an arrangement to move the press wall toward the transfer end to push a stack of forage bales past the sizing structure such that the hinged door arrangement formed by the side doors and the top door engages the stack of bales to force the stack of bales into standardized dimensions prior to delivery into the transport vehicle. As shown in FIGS. 1 and 2, the transport trailer is mounted on wheels 32 for movement of the transport trailer by means of a tractor.

Figure 3:
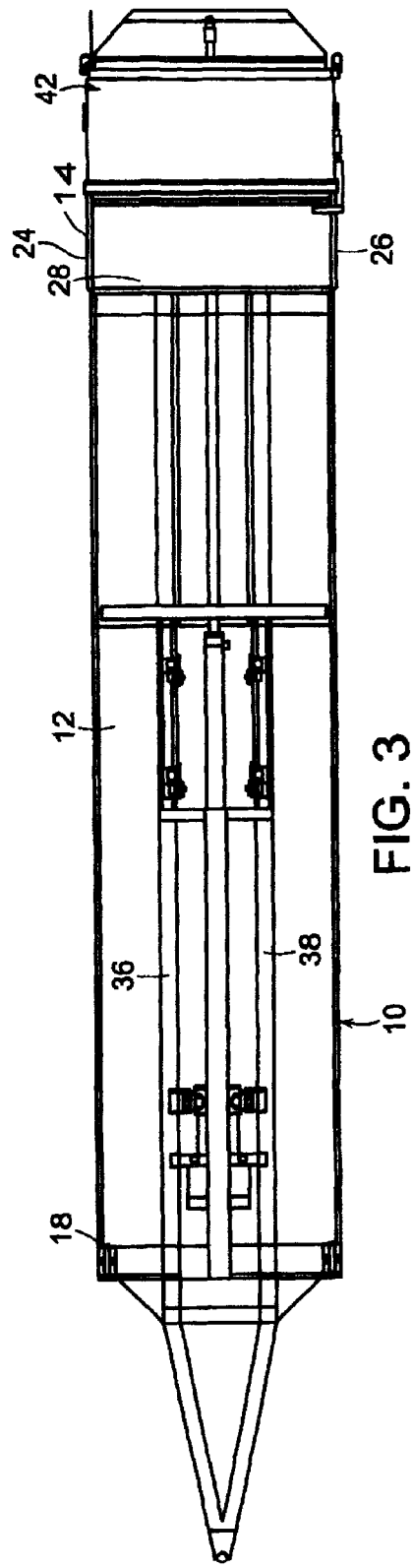
FIG. 3 is a top view of the transfer trailer shown in FIG. 1.
Figure 4:
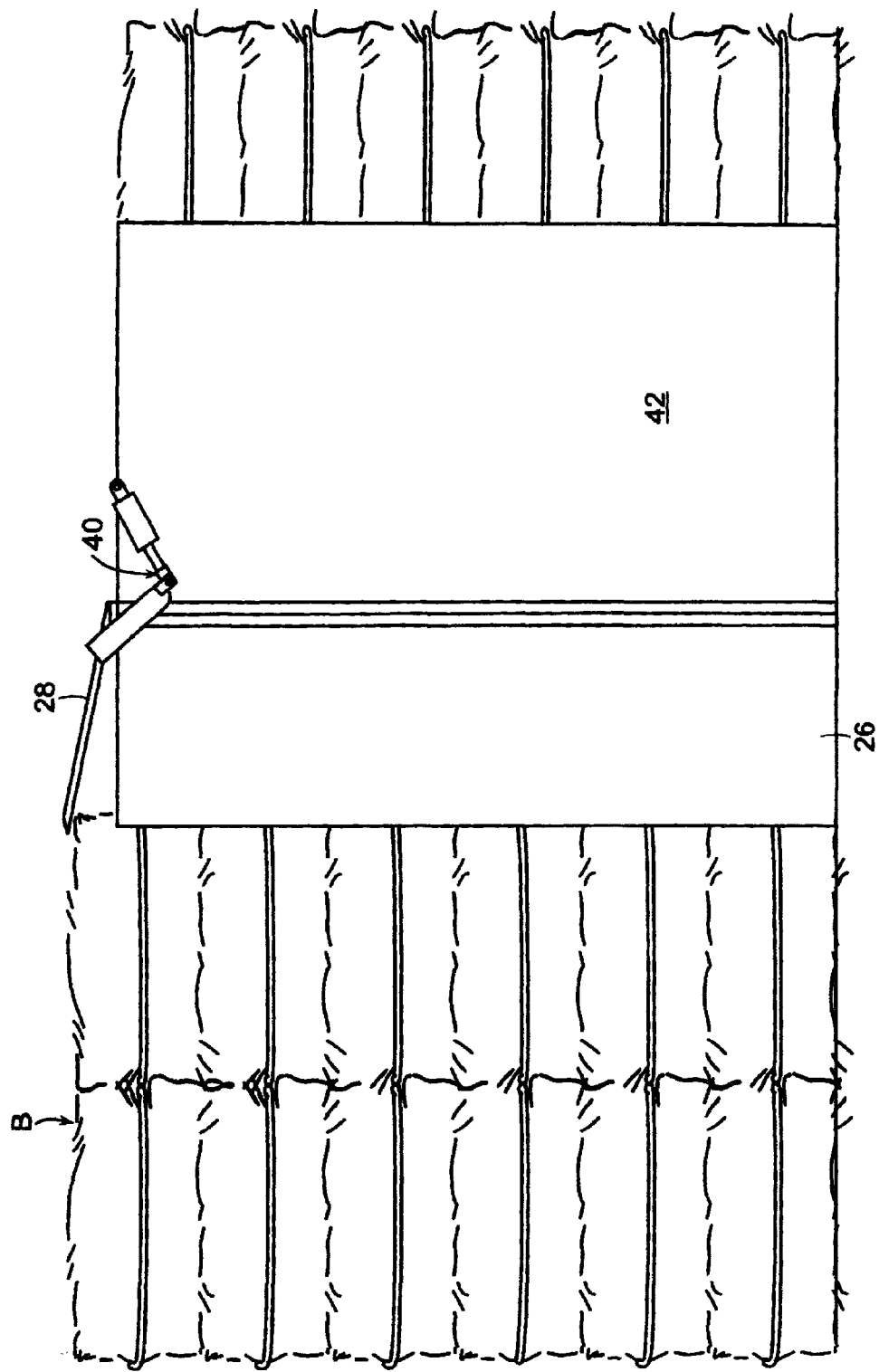
FIG. 4 is a partial side elevation of the sizing structure at the transfer end of the transfer trailer with a stack of forage bales.

As shown in FIG. 3, the press wall is substantially perpendicular to the deck 12 and rides along the deck by means of a trolley 34 riding in parallel grooves 36 and 38 in the trailer deck. As hydraulic pressure is applied to the cylinder of the motive means, the press wall pushes a stack of bales along the deck of the trailer.

Movement of the sizing doors 24, 26 and 28 can be controlled by linkages such as the pivoted linkage shown at 40. The linkages 40 are typically hydraulic cylinders to variably apply the needed force to standardize the stack of bales to the proper dimensions and symmetry for loading into the transport vehicle. Once the sized stack of bales has passed the sizing structure, the bales are forwarded via a set of rigid walls which form a guide chute 42 leading to the open end of the transport vehicle.

In use, the forage loading area of the transfer trailer, that is the area between a loading position of the press wall and the transfer end of the deck, receives forage bales B which can be placed on the deck in a haphazard manner and can have any shape, such as rectangular bales as shown or rolls of forage as is common. Once the forage bales are loaded onto the deck, the motive means is actuated to cause the press wall to move horizontally against the stacks of bales and press the bales together. When the bales reach the transfer end of the trailer, the bales are squeezed together by the angled orientation of the side doors 24 and 26 and compressed in height (i.e. vertically) by the top door 28. With the bales in this condition, the stack of bales is loaded through the guide chute into the transport vehicle.

The opposed side doors 24 and 26 compress the forage bales in a lateral direction relative to the longitudinal axis of the transfer trailer and are hydraulically actuated by linkages thereby controlling the width of the stack of forage bales. The top sizing door 28 is hydraulically actuated to control the vertical size of the stack of forage bales. As shown, the height of the forage bales B is, typically, greater than the height of the transport vehicle, and the angled top sizing door 28 vertically compresses the bales of forage as desired and, if the transport vehicle is enclosed, to fit within the transport vehicle. The sizing doors 24, 26 and 28 open to the limit of the hinges; and, at that point, the sizing doors remain fixed to act as a funnel to size the stack of forage bales in both the vertical and horizontal directions. The walls forming the guide chute maintain the size of the forage bales until the stack of forage bales is loaded into the transport vehicle. The side or vertical sizing doors 24 and 26 are pinned in the closed position to facilitate transport.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A transfer trailer for loading bales of forage into a transport vehicle comprising
    a substantially horizontal deck with a transfer end;
    a press wall mounted on said deck to be movable between said transfer end and a loading position horizontally spaced from said transfer end;
    a forage loading area on said deck disposed between said loading position of said press wall and said transfer end of said deck, said forage loading area being of a size to receive a stack of forage bales;
    a sizing structure disposed on said deck adjacent said transfer end including a hinged door arrangement having an open position defining opposed angled side doors and an angled top door for receiving the stack of bales and applying force to compress the stack of bales to maintain desired dimensions and symmetry, said hinged door arrangement including a first vertically extending side door disposed on one side of said deck adjacent said transfer end of said deck and a second vertically extending side door disposed on a side of said deck, adjacent said transfer end of said deck, opposite said one side, said first and second side doors forming angled walls of said sizing structure, and said angled top door being positioned above said first and second side doors to force the stack of bales in a vertical direction;
    motive means carried on said deck and arranged to move said press wall toward said transfer end to push the stack of bales past said sizing structure such that said hinged door arrangement engages the stack of bales to compress the stack of bales into standardized dimensions prior to delivery to the transport vehicle; and
    a set of rigid walls extending from the sizing structure toward the transport vehicle to form a guide chute leading to an open end of the transport vehicle.

2. A transfer trailer as recited in claim 1 and further comprising a pivoted linkage including hydraulic cylinders to variably apply forces to standardize the stack of bales for loading into the transport vehicle.

\* \* \* \* \*